United States Patent
Henriques et al.

(10) Patent No.: US 7,551,556 B2
(45) Date of Patent: Jun. 23, 2009

(54) MONITORING TRAFFIC IN PACKET NETWORKS USING THE SLIDING WINDOW PROCEDURE WITH SUBWINDOWS

(75) Inventors: Bengt Henriques, Solna (SE); Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 732 days.

(21) Appl. No.: 10/441,174

(22) Filed: May 20, 2003

(65) Prior Publication Data

US 2003/0198183 A1      Oct. 23, 2003

Related U.S. Application Data

(63) Continuation of application No. PCT/SE01/02583, filed on Nov. 22, 2001.

(51) Int. Cl.
*H04L 12/26* (2006.01)
(52) U.S. Cl. ........................ 370/230; 370/252
(58) Field of Classification Search .................. 370/229, 370/395.4, 230, 230.1, 395.43, 395.42, 252, 370/253
See application file for complete search history.

(56) References Cited

U.S. PATENT DOCUMENTS

| | | | | |
|---|---|---|---|---|
| 4,970,714 A | * | 11/1990 | Chen et al. | 370/216 |
| 5,930,233 A | | 7/1999 | Kanerva et al. | |
| 6,370,520 B1 | * | 4/2002 | Ruutu et al. | 707/1 |
| 6,570,849 B1 | * | 5/2003 | Skemer et al. | 370/230.1 |
| 6,671,288 B1 | * | 12/2003 | Onodera et al. | 370/469 |
| 7,158,479 B1 | * | 1/2007 | Noble | 370/229 |

FOREIGN PATENT DOCUMENTS

| | | |
|---|---|---|
| CA | 2249152 | 3/2000 |
| WO | 96/36150 A1 | 11/1996 |
| WO | 00/56023 A1 | 9/2000 |

OTHER PUBLICATIONS

International Search Report mailed Feb. 20, 2002 in corresponding PCT application PCT/SE01/02583.
International Preliminary Examination Report mailed Jan. 30, 2003 in corresponding PCT application PCT/SE01/02583.

* cited by examiner

*Primary Examiner*—Ricky Ngo
*Assistant Examiner*—Gary Mui
(74) *Attorney, Agent, or Firm*—Nixon & Vanderhye, P.C.

(57) ABSTRACT

A data packet network comprises a policer module metering the flow and deciding whether arrived packets are to be transmitted or discarded. The flow of transmitted packets is metered by a sliding window procedure having a fixed window length. The sliding window is divided in a plurality of subwindows of equal length and the sliding window moves by steps corresponding to the length of the subwindows. For each subwindow and for the sliding window counts of transmitted and/or discarded bytes and/or packets are determined and stored. For an arrived packet the counts of the current subwindow are compared to a maximum value obtained from the counts of the sliding window and an absolute maximum value, and based on the result of the comparison, the policer module will transmit or discard the packet. The policer module can perform soft policing in the case where the packets belong to different traffic classes.

9 Claims, 4 Drawing Sheets

Fig. 1

Edge classification
Call admission
Strict policing

Call aggregations in routers
Statistical multiplexing
Priority scheduling
Soft policing

Added functionality

Fig. 7

Functionality for the Sliding Window when only one traffic class is used

MONITORING TRAFFIC IN PACKET NETWORKS USING THE SLIDING WINDOW PROCEDURE WITH SUBWINDOWS

This application is the continuation of international application PCT/SE01/02583 filed 22 Nov. 2001 which designates the U.S.

TECHNICAL FIELD

The present invention relates to monitoring traffic in packet networks, in particular to policing and especially metering functions.

BACKGROUND

Figure 1:
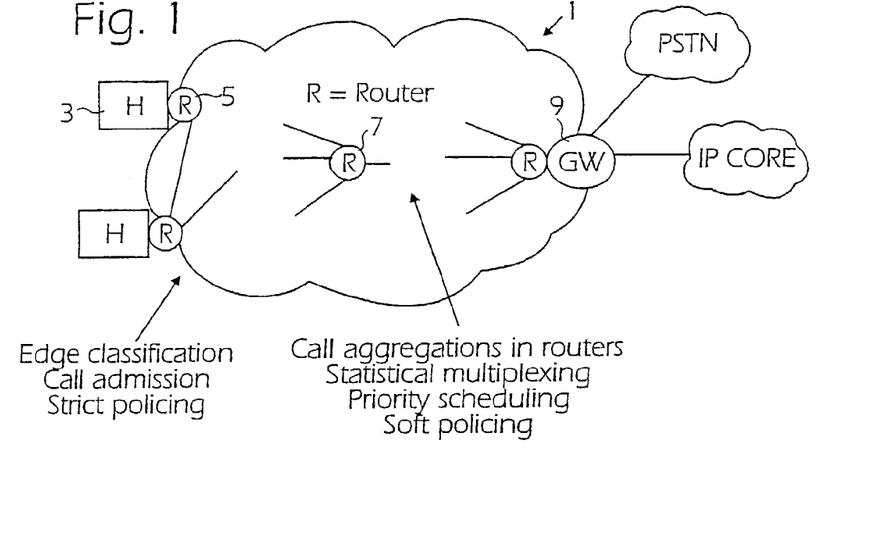
FIG. 1 is a schematic illustrating an IP network.

In an IP-network information is transmitted between hosts through routers placed at the edge of and inside the network, see FIG. 1. An IP-network is an example of a packet network which generally uses a multitude of switching elements connecting terminals placed at the edge of network. A packet based network can generally support variable bit rate services, such as different codings of speech and data services, much better than an STM (Synchronous Transfer Mode) network, since statistical multiplexing can be used. The multiplexing gain in packet networks improves e.g. the number of speech/data channels that can be used to transmit information between the terminals. Operation and maintenance of packets networks can be simplified compared to STM networks and the traffic associated therewith be multiplexed with other traffic.

However, when the traffic flow on a link between e.g. two routers in an IP-network is too high, congestion can occur and then some packets must be discarded, since otherwise the real-time demands of some of the traffic will not be fulfilled. The new technologies that allows the use of IP-network also for voice traffic introduce different levels of service for different traffic types. Voice traffic is very sensitive to delay and jitter, but data is more sensitive to loss of packets. Thus, a separation of the levels of QoS (Quality of Service) is needed between voice and data traffic. QoS separation is the capability of a network to provide a better service for selected network traffic, i.e to treat different classes of traffic differently. An architecture providing QoS separation is the Differentiated Services, DiffServ, as proposed by the IETF, the Internet Engineering Task Force. Still, this architecture lacks some performance so there is a need for improved solutions.

One of the main causes of congestion in packet switched networks comprises that the traffic is often bursty. If the traffic was uniform, such as e.g. in circuit switched telephony, it would be easy to predict its behaviour and dimension the networks accordingly. In the packet data case, dimensioning is much more difficult and requires weighting between packet loss, induced delay and efficient usage of bandwidth.

To use the bandwidth efficiently, the bursts must be smoothed out in time. This is done by using buffers in the routers in which packets will be queued until the link is ready—a delay is thus induced in the queue—and it is regarded as implicit traffic shaping. This works well when the average traffic flow over a period of time is less then the egress bandwidth but when the ingress traffic over a period of time exceeds this limit, some packets must be discarded.

Policing is a general term for the process of preventing a traffic stream from seizing more than its share of the resources, i.e. to protect the network from non-trusted users. Policing can be done for the aggregated flow, for the separate service classes of DiffServ or for the packet flow of individual users. Policing acts in a short time perspective and actions take place locally, at the router level. The policing function consists of two different parts, metering and discarding. Metering is the function that monitors the arrival times of packets of a traffic stream and determines the level of conformance of each packet to a pre-established traffic profile.

The meter function should be able to handle bursty traffic and at the same time utilize the bandwidth on the egress link efficiently. When congestion is indicated, the discarding function is activated, deciding whether to transmit or discard the arriving packets. This decision will depend on several parameters such as aggregated flow, class based flow, QoS class of the packet, etc. Discarding can also take place in a scheduler, i.e. that part of a router which actually forwards the packets, but it is preferable that all of the dropping takes place in the policer because of the unpredictable manner in which packets are dropped in a scheduler.

When the traffic to a large extent consists of voice packets, the delay demands are so important that the scheduler should be a priority scheduler, provided that the voice traffic is assigned a high priority traffic class. A priority scheduler always serves the non-empty queue of highest priority. This might cause starvation of the lower priority traffic but it can also imply too long delays to the high priority traffic if too much traffic is let through, i.e. it will cause too long queues in the scheduler.

One known solution to this problem, i.e. how to police the traffic flow in order to fulfil the demands of the different traffic classes, is to use a Token Bucket procedure as the policer, see A. Tannenbaum, "Computer Networks—Third Edition" Prentice Hall 1996, pp. 381-384. The Token Bucket procedure monitors the packets of the incoming traffic stream and discards the packets that are out of profile compared to a pre-established traffic profile. When using the Token Bucket procedure, a priority scheduler can-be used.

There are several other mechanisms that can be used for policing e.g. WFQ (Weighted Fair Queuing), CBQ (Class Based Queuing) but the fact that they do not provide a strict priority to higher priority classes makes them less useful for real-time applications.

In the article E. P. Ratgeb, "Modelling and Performance Comparison of Policing Mechanisms for ATM Networks", IEEE Journal on selected areas in communications. Vol. 9, No. 3, April 1991, some policing procedures that are "window-based" are discussed and evaluated, including also a "Moving Window" procedure, herein called the Sliding Window procedure.

When using a priority scheduler, there is a risk that traffic of lower priority will suffer from "starvation", i.e. the queues will not be served, as has been mentioned above. This is very critical in networks in which traffic classes of different priorities have real time demands. To guarantee that such starvation will not occur, there must be a functionality that polices, i.e. meters the traffic flow and discards packets that are out of profile, the traffic flow so that a certain traffic class does not overuse its share of bandwidth. This also protects a traffic class from delaying "itself" too long. Too much traffic in the queue will introduce a too long delay. The IETF proposed the Token Bucket procedure as a policer. The proposed procedure have some properties that are not desirable, especially in the case where the traffic mainly comprises voice traffic. In addition to voice traffic, there are also other real time classes. The undesirable properties comprise that during the time period following immediately after a congestion has been indicated traffic classes of lower priority might suffer from starvation, and that a strict upper limit of the induced delay can not be guaranteed. This results from the fact that the Token Bucket procedure has a reaction time due to the bucket size, which gives a high probability that the bucket is full when congestion is indicated.

Another important aspect is how to measure the aggregated flow when using the Token Bucket procedure. This measurement is required to allow the use of "soft policing". Soft policing means that the policing is only performed when the aggregated flow is above a certain threshold. The Token Bucket procedure has two parameters, the token rate and the bucket size. The token rate is the rate with which the bucket is filled with tokens so it does not tell anything about the flow. The only parameter that tells anything about the flow situation is the present amount of tokens in the bucket, but there is no easy way to use that information to calculate the aggregated flow. This means that some flow meter for the aggregated flow has to be added.

For the Token Bucket procedure to work properly it must be calibrated for the worst case traffic scenario in a network. This might give bad qualities for the other possible traffic cases that can occur in the network.

SUMMARY

It is an object of the present invention to provide an efficient policing function for a packet network having values of maximum allowed packet flows.

When using a Sliding Window (SW) based policer function the unwanted properties that the Token Bucket procedure introduces will not trouble the system. A policer function or procedure generally consists of two parts, a meter function or procedure and a dropper function or procedure. The sliding window function is then used as the meter function.

The sliding window procedure can be designed for a network using the fact that there is some information on the way in which the traffic behaves in the network, such as in an IP network. The repetitive characteristic of the codecs and the requirement, that delays should be smaller than one repetition interval, result in that the resource budget is approximately one repetition interval. The bandwidth can therefore be portioned into periods—voice packets are e.g. typically sent every 20 ms—and the resources can be estimated as bytes per period. The use of a sliding window gives a measure of the amount of the resources that are used during this period and packets will be discarded when the resources are over-utilized. In contrast to the Token Bucket procedure, the Sliding Window procedure sets a fixed upper limit to the amount of traffic that can be transmitted during a certain time. This is an important aspect when the maximum delay is estimated.

By using the sliding window as the meter function in the policer, the special demands that the different traffic classes can have e.g. in IP-networks, especially hard real-time demands, can be fulfilled and at the same time using the bandwidth more efficiently.

With a sliding window based policer it is easy to measure the aggregated flow which implies that packets does not need to be discarded even if a traffic class overutilizes its share of the resources. This is the base for soft policing. Soft policing implies that discarding of packets is only done when the aggregated flow exceeds a certain threshold. This means that the bandwidth of the links can be used more efficiently, what is important for narrow links.

The precision of procedures using a sliding window is maybe the most important feature. The performance of sliding window base procedures is well known—the maximum delay for a traffic class can be calculated—implying that the resources can be used more efficiently.

Generally, when transmitting or discarding arrived data packets in some unit in a network, a sliding window can thus be used. It has a fixed length to meter the flow of data packets and an arrived data packet is transmitted or discarded based on the metered flow. To make this method work more efficiently, it is proposed that the sliding window is divided into a plurality of subwindows of equal length. Counts of transmitted and/or discarded bytes and/or packets are determined both for the sliding window and for each of the subwindows. An arrived data packet is then transmitted or discarded based on the count/s/both for the current subwindow and for the sliding window. The sliding window can perform its sliding movement by being displaced in steps equal to the length of the subwindows. The movement of the sliding window can be controlled only by the events of arrived data packets. Then, if the current subwindow is defined as that subwindow within which the latest arrived data packet arrive, a new data packet having an arrival time which is not within the current subwindow, the sliding window can thus be moved, the movement step being equal to the length of the subwindows. A new subwindow becomes the current subwindow and has counts set to zero. It replaces the oldest subwindow.

In the case where the arrived data packets belong to different traffic classes having different priorities, a separate sliding window as described can be used for data packets of each traffic class. The sliding window of each class then have a fixed length individual to the class and it also own subwindows, the length and/or number of which can be individual to the class. The count/s/as described are updated individually for the sliding window and the subwindows of each class. For soft policing, a data packet belonging to a considered class is decided to be allowed to be transmitted or discarded based on a congestion measure such total count/s/obtained from the count/s/for the sliding windows of all classes and also preferably from the count/s/of the current subwindows of all classes.

A policer module as described herein is thus used for transmitting or discarding arrived data packets and includes metering means executing a sliding window procedure having a fixed window length to meter the flow of data packets. The module further includes decision means, also called a dropper or discarding unit, connected to the metering means to decide whether an arrived data packet is to be transmitted or discarded based on the metered flow. The metering means can then have a plurality of counting means for determining the count/s/for the sliding window and for the subwindows and memory cells can be provided for storing the counts. Comparing means in the metering means compare the count/s/of the current subwindow to a maximum value obtained from the count/s/of the sliding window and an absolute maximum value. The decision means transmits or discards an arrived data packet based on the result of the comparing in the comparing means. Also, for the current subwindow a memory field can be provided for storing the time at which the current subwindow will end and time stepping means can increment this time by a fixed time length when the sliding window is to be moved by one step.

Additional objects and advantages will be set forth in the description which follows, and in part will be obvious from the description, or may be learned by practice. The objects and advantages may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

The policing and metering functions and devices therefor to be described herein can be used in any kind of packet switched network, e.g. an IP network. In FIG. 1 an IP network 1 is illustrated connecting hosts 3 through routers 5 placed at the border or edge of the network and routers 7 placed inside the network to a gateway 9, which in turn is connected to various services or other networks such as the PSTN (Public Switched Telephone Network and an IP Core. In the network 1 packets carrying information are transmitted between the hosts and the gateway. The packets can generally belong to different traffic classes requiring different levels of transmission handling in the network, such as the priority, whether packets may be discarded, etc. In the routers 5, 7 congestion of packets can occur, i.e. the routers can receive too many incoming packets and then some received packets must be discarded.

Figure 2:
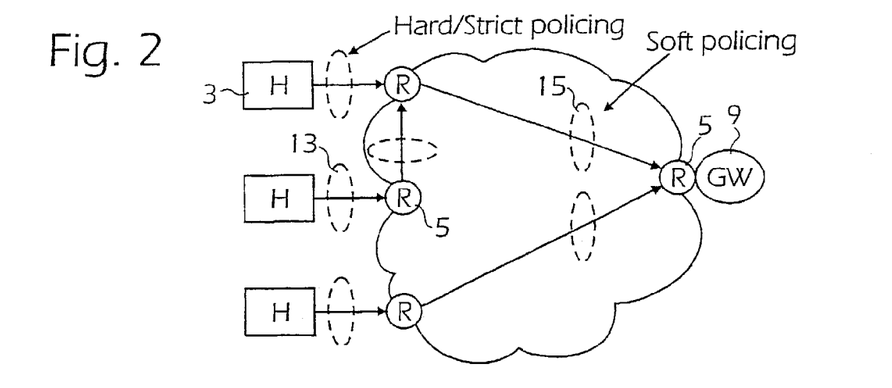
FIG. 2 is a schematic illustrating the places where soft and hard or strict policing should be performed in an IP network.

For that reason policer procedures can be included, see the schematic picture of FIG. 2. Here, the hosts 3 transmit packets to edge routers 5 at the border of the network 1 as monitored or supervised by policer procedures as indicated by the rings 13. These procedures, performed at the output side of the transceivers 11 or perhaps preferably at side of the edge routers 5 coupled to the hosts, allow only a maximum flow of packets for each traffic class or generally, the incoming traffic is mapped onto a predefined traffic profile to check if the traffic will get admission to the network or not. In this case where the policing is strictly performed for each traffic class, i.e. where each traffic class is policed individually or independently of the other classes, the policing is called hard or strict policing. Inside the network, at the routers 7 and between the edge routers 5, soft policing is performed as indicated by the rings 15. Soft policing means that the traffic only will be policed if the total band width usage exceeds that of the available physical link. If no congestion exist, more traffic than the configured amount for a considered can be let through. The policing functions, when active, generally operate for every traffic class monitoring all of the different flows all the time. Also, strict policing can in some cases or if so preferred be used inside the network.

Figure 3:
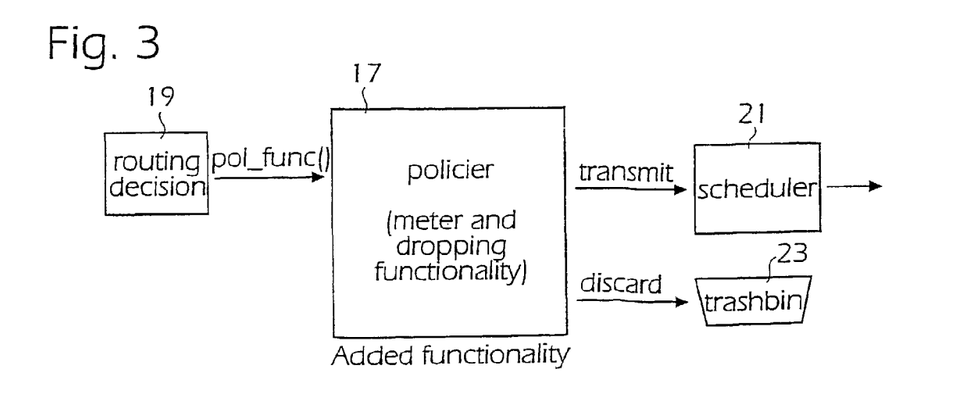
FIG. 3 is a schematic of a policing module.

Functions for soft and strict policing can be included in the network 1 for instance at the output ports of the routers 7. The policing can then be executed as indicated in FIG. 3. The policing unit or module 17 receives packets from a routing unit 19, in which a routing decision has been made. The flow of received packets is metered, i.e. the statistics of the flow is determined, in the policing unit 17 and based on the metered flow the received packets are either allowed to pass to a scheduler 21, from which the packets are forwarded, or are discarded, as indicated by the trashbin 23. Strict policing can be included in those sides of edge routers 5 which are connected to the hosts or generally to device at edge of the network and then the corresponding policing module include at least the units 17, 21 and 23 of FIG. 3. The discarding of packets can also be made before the packets enter the scheduler 21, in a separate decision or dropping unit connected to the input of the scheduler, as will be described hereinafter.

Figure 4:
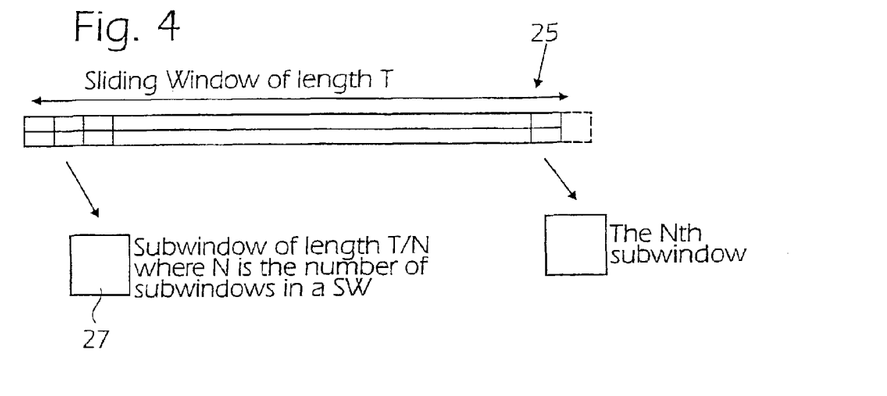
FIG. 4 is a schematic of a sliding window comprising a multitude of subwindows.

The policing module 17 can use a sliding window procedure particularly designed for the network, based on information on the traffic behaviour in the network A sliding window 25 partitioned in N equal subwindows 27 is schematically illustrated in FIG. 4. The sliding window is a time period of length T, during which the packets arrived to the module are evaluated as to their arrival times considering their traffic classes and statistics relating to forwarding and discarding of the packets are determined. The subwindows are thus time periods having the length T/N and for each subwindow also the packets arrived to the module are evaluated and the statistics of the subwindows are determined. The sliding window starts at a time $t_s$ and ends at time $t_e = t_s + T$. The start and end times are changed at regularly repeated times, the interval between these times being a repetition period equal to the length T/N of each subwindow. Thus, for the start times the relation $t_s = n \cdot (T/N) + t_0$ is true, where $t_0$ is some start time and n is an integer value incremented every (T/N):th unit of time. Hence, the sliding window slides in time or more exactly makes small jumps or hops having a length of a subwindow.

A new repetition period thus starts with every new subwindow, which thus is the current subwindow and has the order number N. The amount of resources, i.e. the maximum number of bytes or the maximum number of packets which are allowed to be transmitted, to be used for the N:th subwindow is the amount corresponding to the maximum resources to be used for the whole window subtracted by the resources used in the other, N−1 previous subwindows. When the resources have been spent in the Nth subwindow, the new packets that arrive within this window are discarded, i.e. the new packets are discarded until a new period or subwindow starts which will then be the Nth subwindow. This guarantees that no more than a certain amount of bytes or packets is spent during the time T of the whole sliding window.

Figure 5:
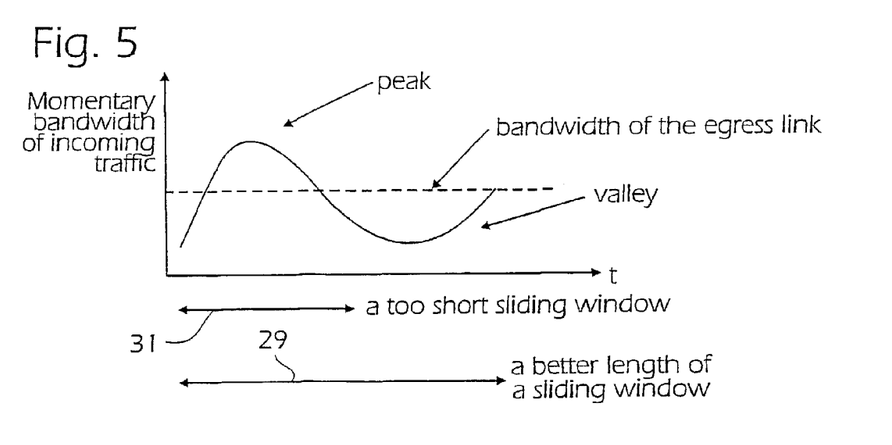
FIG. 5 is a diagram illustrating the effect of different lengths of the sliding window on the momentary bandwidth.

In the diagram of FIG. 5 an example of a varying momentary bandwidth of incoming traffic is shown as a function of time, the momentary bandwidth being essentially the flow of bytes or packets, i.e. the number of bytes or packets received per unit of time. It appears that the method works well in the case where there is one traffic peak and one traffic valley during one sliding window, see the arrow 29 indicating a suitable length of the total sliding window. For a too short sliding window, see the arrow 31, which covers just one peak or one valley, too many packets are discarded when a traffic peak occurs and the link is then also poorly used when a valley occurs.

For each subwindow the determined statistics are stored in corresponding memory fields as will be described hereinafter. The statistics comprise several parameters describing the packet flow during the subwindow, see FIG. 6. The most important information to be stored comprises the numbers of bytes and the numbers of packets that are allowed to be transmitted and are discarded in each subwindow. The information can also comprise a parameter indicating the time when the present subwindow is to be/was replaced, the window limit. Preferably, the updating of the sliding window, i.e. the change of subwindows, is not driven by an interrupt but instead is event driven when a packet arrives, the arrival time of the packets must be compared to the window-limit to check whether the statistics for the current window or the next one has to be updated. However, the updating can also, obviously, be hardware or software driven in other ways such as by hardware or software interrupts or monitored in a parallel software process.

Figure 6:
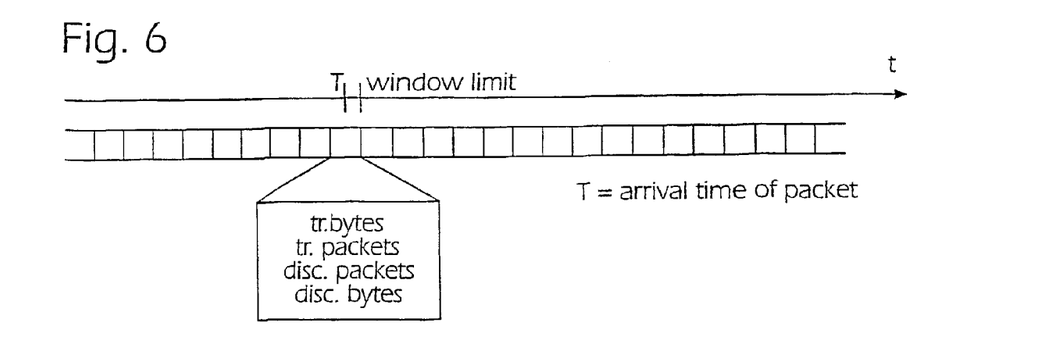
FIG. 6 is a schematic illustrating some important parameters of a subwindow of a sliding window.

Hence, when a packet arrives, the arrival time of the packet is determined and use to decide the subwindow to which the packet belongs. If the arrival time is smaller than the window limit, the statistics of the present subwindow is updated. If the arrival time of the packet is greater then the window limit, the statistics for the total sliding window must be updated. Then the statistics for the oldest subwindow in the window are subtracted from the statistics of the total sliding window, and the statistics of the latest subwindow, i.e. the subwindow which is being terminated, is added to the statistics of the total sliding window. Sometimes the time elapsed between two consecutive packets can be longer than one subwindow. Then the updating continues iteratively to the next subwindows until the window limit of a subwindow is greater than the arrival time of the packet.

Figure 7:
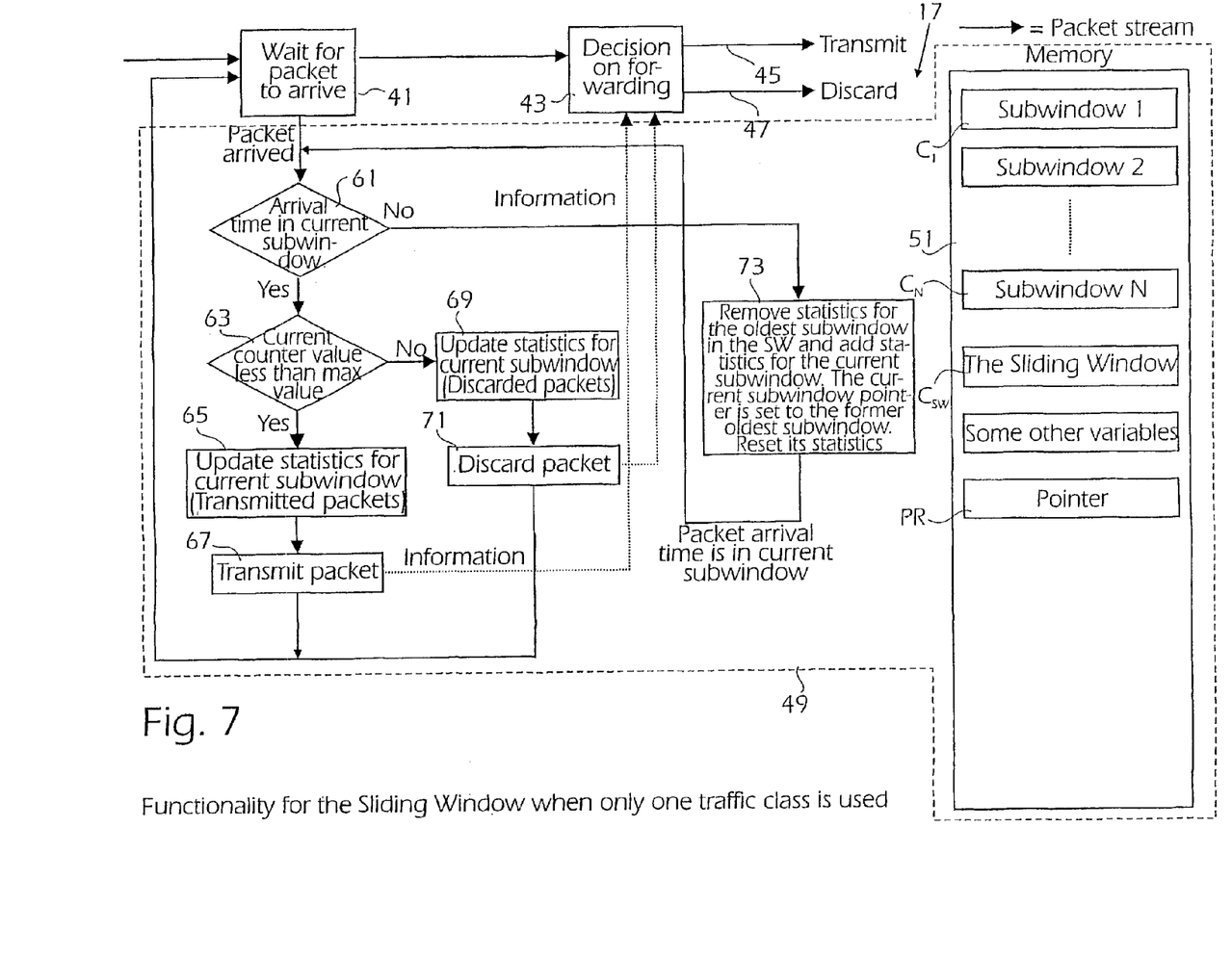
FIG. 7 is a diagram illustrating the procedural steps executed when receiving a new packet at a policing module in a network comprising one traffic class.

The handling and procedural steps performed in the policer module also appear from FIG. 7 for the case of only one traffic class. In this case, according to the discussion above, the policer module executes only hard or strict policing. In a timestamping block or unit 41 packets are received and the time is determined of the arrival of each packet. Also the number of bytes of the packet can be determined for a later updating of the statistics of the current subwindow. In a decision block or unit 43, also called a discarding or dropper unit, it is decided whether a packet will be transmitted or forwarded, see the arrow 45, or be discarded, see the arrow 47. In the case where the packet is to be forwarded, it is stored in buffer of a scheduler, see FIG. 3, from which the buffered packets are transmitted in some chosen order. The metering functions of the policer module are performed by a metering unit 49.

In a memory 51 of the policing module memory cells $C_1, \ldots, C_N$ are provided for storing the statistics of the subwindows of the sliding window, the memory cell $C_N$ storing statistics of the current subwindow. Each memory cell includes fields, not shown, for the numbers or counts described above, i.e. counts for forwarded bytes, counts for forwarded packets, counts for discarded bytes, and counts for discarded packets. In at least the current memory cell $C_N$ there is a field for storing the time limit, i.e. a value indicating the time when the subwindows will terminate. The memory cells $C_1, \ldots, C_N$ are preferably arranged cyclically, as a cyclical memory, the memory cell $C_N$ of the current window being pointed to by a pointer stored in a pointer register PR. The memory 51 also has a memory cell $C_{SW}$ for the statistics of the whole sliding window. This memory cell holds fields, not shown, for the same kind of counts as described above.

At the instant when a new packet is timestamped by the block 41, a sequence of procedural steps are performed. Thus, it is first determined in a block 61 whether the packet has arrived within the current subwindow. This is made by comparing the arrival time of the packet to the limit of the current subwindow as stored in a field of the memory cell $C_N$ assigned to the current subwindow. If the received packet is determined to be within the current subwindow, it must be decided whether already the allowed number of packets and/or bytes has been transmitted during this subwindow and thus a block 63 is executed. In this block the different counts of the current subwindow are compared according to some algorithm to maximum values. The maximum values are in turn derived from the statistics of the total sliding window as stored in the memory cell $C_{SW}$ and absolute maximum values. In a simple case/According to a simple algorithm only the count of forwarded bytes of packets for the current subwindow is compared to the difference of the absolute maximum count for forwarded packets and the count of forwarded packets of the total sliding window. If it is decided in the block 63 that the packet can be forwarded, a block 65 is executed in which the statistics of the current subwindow are updated. This means that the fields of the counts of forwarded packets and forwarded bytes in the cell $C_N$ are incremented by one and by the number of bytes of the packet respectively. A signal is then sent from the next block 67 to the decision unit 43 informing it that the packet is to be forwarded. After the block 67 the arrival of a new packet is awaited in the timestamping unit 41.

If it is decided in the block 63 that the packet cannot be forwarded but has to be discarded, a block 69 is executed for updating the statistics of the current subwindow. Then the fields of the counts of discarded cells and discarded bytes in the cell $C_N$ are incremented by one and by the number of bytes of the packet respectively. In the next block 71 a signal is then sent to the decision unit 43 informing it that the packet is to be discarded. After the block 71 the arrival of a new packet is awaited in the timestamping unit 41.

In the case where it is determined in the block 61 that the new packet has an arrival time not within the current subwindow, the sliding window must be allowed to "slide" or be displaced forwards by the length of at least one subwindow. Then a block 73 is executed in which first the statistics of the total sliding window are modified. This is made as described above by subtracting the counts for the oldest subwindow as stored in the fields of the memory cell $C_1$ from the respective counts of the total sliding window and then adding the counts of the current window to the result of the subtraction. The pointer value is changed to the next position in the cyclical sequential order of the memory cells $C_1, \ldots, C_N$, i.e. to point to the memory cell of the oldest subwindow. The statistics of this subwindow are reset to zero and a new time limit is calculated and stored in the field provided therefor. Then the block 61 is again executed to determine whether the packet is within the now selected, current subwindow.

It is obvious that the procedural steps of FIG. 7 can be modified in different ways and arranged with different logic decisions. Some of the steps can e.g. be performed in an inverted order or simultaneously.

For the case where several different traffic classes are used in the network, such as for soft policing, each traffic class can be policed by its own sliding window where the length of the sliding window is set to match either the repetitive characteristics of the traffic or by the maximum delay requirements of the packets of the class. Congestion is indicated when a weighted sum of the traffic sent during the different sliding windows exceeds a certain threshold. After detecting a congestion state, either every class can be policed separately using for each class independently the method described with reference to FIG. 7, or a distribution algorithm can used according to which a certain amount of resources will be available for the different sliding windows as long as the congestion situation persists. The algorithm can be designed to distribute in a flexible manner the amount of resources to the different SWs.

Figure 8:
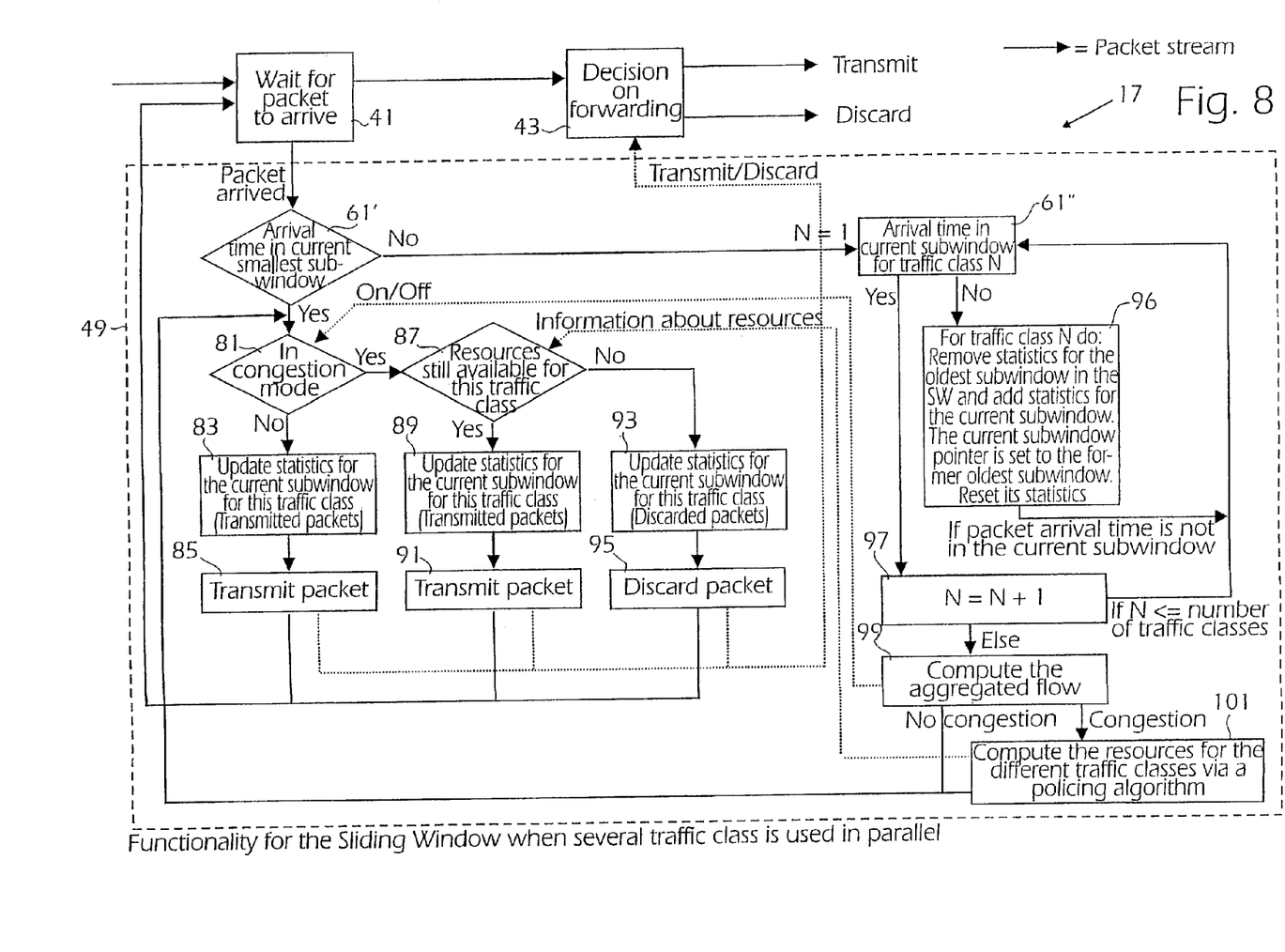
FIG. 8 is a diagram similar to that of FIG. 7 for a policing module in a network comprising several traffic classes.

The procedural steps to be executed in this case appear from FIG. 8. For each traffic class $P_1, P_2, \ldots$ memory cells $C_{1,Pn}, C_{2,Pn}, C_{N,Pn}, \ldots, C_{N,Pn}$, etc., $n=1, 2, \ldots$, are provided, and it is assumed that the sliding windows of the traffic classes all have the same number N of subwindows. The subwindows then can have different lengths for the classes. However, it is also possible to have different numbers of subwindows but this case is not discussed with reference to FIG. 8. A pointer to the current subwindow for each class is provided. The updating of the different sliding windows can then be made for the shortest one of the subwindows. Preferably, every subwindow for every class should start at the time when one of the shortest windows starts. This means i.a. that in this case the lengths of the subwindows are multiples of the length of the shortest subwindows.

The basic units involved in the handling are only modified by the timestamping unit 41 also determining the traffic classes of the received packets. When the timestamping unit 41 detects the arrival of a new packet, a signal is transmitted to start the logical steps of the procedure. Then a first decision block 61' is executed in which it is asked whether the time of arrival of the packet is within the smallest of the current subwindows. If it is true a block 81 is executed in which it is decided whether the module is in congestion mode, as will be described below. If the policing module is decided not to be in a congestion mode, a block 83 is executed in which basically the same operations are performed as in the block 65 of FIG. 7 but for the fields of the memory cell of the current subwindow for the class to which the packet belongs. Then a block 85 similar to the block 67 is executed whereafter the arrival of new packet is again awaited in the unit 41.

If it was found in the block 81 that the module is in a congestion mode a block 87 is executed in which it is determined whether there still exist resources for the traffic class to which the packet belongs. This means that substantially the same comparison is made as in block 63 of FIG. 7, i.e. evaluating the counts of the current subwindow of the class of the packet in relation to the counts for the total sliding window of the class and to maximum allowed counts for the class. If it is determined that resources are still available for the class, blocks 89 and 91 are executed in which the same operations are performed as in blocks 83 and 85 respectively described above. Then the arrival of a new packet is again awaited in the unit 41.

If it is decided in the block 87 that no resources are left for the class, blocks 93 and 95 are executed in which the same operations are performed as in blocks 69 and 71 of FIG. 7 but the updating of statistics is made for the subwindow of the traffic class of the packet. Then the arrival of a new packet is again awaited in the unit 41.

If it is decided in the block 61' that the arrival time of the packet is not within the smallest of the current subwindows a new decision is made in a block 61" in which it is determined whether the arrival time of the packet is within the current subwindow of the traffic class having the first order number $n=1$. If the arrival time is within this subwindow, a block 97 is executed in which the order number n of the traffic class is incremented by one. If there is such a class, i.e. if the new $n<N_P$, the block 61" is again performed for the new n, i.e. it is decided whether the arrival time is within the subwindow of class n. If there is no such another class, after incrementing n in block 97, i.e. the new $n>N_P$, a value of the aggregated flow is calculated in a block 99, e.g. as a weighted sum of the counts for all sliding windows. The counts used in this weighted sum should be counts indicating in the best possible way the current state for the classes, and can be obtained from the statistics of the current total sliding windows to which are added the statistics of the current subwindows of the respective class. The value of the aggregated flow is used for determination of a possible congestion state in the block 81 described above. In the case where the value indicates a congestion state, e.g. if the aggregated flow value exceeds some threshold value, a block 101 is executed in which the resources for the traffic classes are calculated using a policing algorithm. This algorithm can distribute the remaining resources in a static, predetermined way used fixed shares for each class, whereafter strict policing for each class is performed, until the congestion state disappears. After the block 101 and in the case where no congestion state is indicated the block 81 is performed as described above.

It can be determined in the block 61" that the arrival time is not within the subwindow of class n and then a block 103 is executed, in which the statistics and the pointer are modified as described for the block 73 of FIG. 7 but only for the memory cells belonging to the traffic class n. Then the block 61" is exeucated again as described above.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A method of transmitting arrived data packets, the method including use of a sliding window having a fixed length to meter the flow of data packets, an arrived data packet being transmitted or discarded based on the metered flow, wherein
    the sliding window is divided into a plurality of subwindows of equal length including a current subwindow and an oldest subwindow,
    for the sliding window and each of the subwindows at least one of the following are performed:
        determining a count of transmitted bytes,
        determining a count of transmitted packets,
        determining a count of discarded bytes, and
        determining a count of discarded packets, and
        a data packet is transmitted or discarded based on the counts for the current subwindow and for the sliding window; and
    for an arrived data packet the count of transmitted bytes and or or, respectively, the count of transmitted packets for the current subwindow is or are, respectively, compared to the difference of an allowed maximum number of transmitted bytes and or or, respectively, an allowed maximum number of transmitted packets and the count of transmitted bytes and or or, respectively, the count of transmitted packets for the sliding window.

2. The method of claim 1, wherein the sliding window moves by steps having lengths equal to the length of the subwindows.

3. The method of claim 1, wherein for a data packet having an arrival time not within the current subwindow, the sliding window is moved by a step equal to the length of the subwindows, a new subwindow becoming the current subwindow and having a count or counts, respectively set to zero.

4. The method of claim 3, wherein when the sliding window is moved, the count or counts, respectively, of the sliding window is or are, respectively, modified by subtracting the count or counts of the oldest window and adding the count or the counts, respectively, of the current subwindow.

5. A method of transmitting arrived data packets, the method including use of a sliding window having fixed length to meter the flow of data packets, an arrived data packet being transmitted or discarded based on the metered flow, wherein
   the sliding window is divided into a plurality of subwindows of equal length including a current subwindow and an oldest subwindow,
   for the sliding window and each of the subwindows at least one of the following are performed:
      determining a count of transmitted bytes,
      determining a count of transmitted rackets,
      determining a count of discarded bytes,
      determining a count of discarded packets, and
   a data packet is transmitted or discarded based on the counts for the current subwindow and for the sliding window;
   and wherein in the case where the arrived data packets belong to different traffic classes having different priorities, a separate sliding window is used for data packets of each traffic class, each separate sliding window having a fixed length individual to the traffic class and own subwindows and the count or counts, respectively, is or are, respectively being updated individually for the sliding window and the subwindows of each class, a data packet belonging to a considered traffic class being transmitted based on a total count or total counts, respectively, obtained from the counts for the sliding windows of all classes.

6. The method of claim 5, wherein the total count or the total counts, respectively, are obtained also from the counts of the current subwindows of all traffic classes.

7. The method of claim 5, wherein for an arrived data packet a value of aggregated flow is calculated as a weighted sum of the counts for the sliding windows of all traffic classes and for the current subwindows of all traffic classes.

8. A policer module for transmitting or discarding arrived data packets, the arrived data packets belonging to different traffic classes having different priorities, the policer module including a metering unit executing a sliding window procedure having a fixed window length to meter the flow of data packets, and further including a decision unit connected to the metering unit to decide whether an arrived data packet is to be transmitted or discarded based on the metered flow, wherein the metering unit comprises
   a counting unit for determining at least one of
      a count of transmitted bytes,
      a count of transmitted packets,
      a count of discarded bytes, and
      a count of discarded packets,
   of the sliding window and for a plurality of subwindows of the sliding window, the subwindows having equal length and including a current subwindow and an oldest subwindow, and
   a comparing unit for comparing the count or counts, respectively, of the current subwindow to a maximum value obtained from the count or counts, respectively, of the sliding window and an absolute maximum value, the decision unit arranged to transmit or discard an arrived data packet based on the result of the comparing,
   the metering unit is arranged to use a separate sliding window for data packets of each traffic class having a length individual to the respective traffic class, each separate sliding window having own subwindows,
   the counting unit including subunits arranged individually for the sliding window and the subwindows of each traffic class,
   the comparing unit is arranged to use in the comparing a value of the total transmitted flow obtained from the counts for the sliding windows of all traffic classes and to compare this value to a set maximum value.

9. The policer module of claim 8, wherein the value of the total transmitted flow is obtained also from the counts of the current subwindows of all traffic classes.

* * * * *

UNITED STATES PATENT AND TRADEMARK OFFICE
CERTIFICATE OF CORRECTION

| | |
|---|---|
| PATENT NO. | : 7,551,556 B2 |
| APPLICATION NO. | : 10/441174 |
| DATED | : June 23, 2009 |
| INVENTOR(S) | : Henriques et al. |

It is certified that error appears in the above-identified patent and that said Letters Patent is hereby corrected as shown below:

On the Cover Page, please insert the following:

item -- [30] Foreign Application Priority Data

Nov. 22, 2000   [EP]   Europe ..................... 00204136.6 --

Signed and Sealed this

Twentieth Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,551,556 B2  Page 1 of 1
APPLICATION NO. : 10/441174
DATED : June 23, 2009
INVENTOR(S) : Henriques et al.

It is certified that error appears in the above-identified patent and that said Letters Patent is hereby corrected as shown below:

In Column 2, Line 35, delete "can-be" and insert -- can be --, therefor.

In Column 5, Line 29, delete "therefor" and insert -- therefore --, therefor.

In Column 9, Line 6, delete "$C_{2,Pn}$, $C_{N,Pn}$," and insert -- $C_{2,Pn}$, --, therefor.

In Column 10, Line 22, delete "execuated" and insert -- executed --, therefor.

In Column 10, Line 55, in Claim 1, delete "or or," and insert -- or, --, therefor.

In Column 10, Line 58, in Claim 1, delete "or or," and insert -- or, --, therefor.

In Column 10, Line 60, in Claim 1, delete "or or," and insert -- or, --, therefor.

In Column 11, Line 9, in Claim 5, delete "having" and insert -- having a --, therefor.

In Column 11, Line 19, in Claim 5, delete "rackets," and insert -- packets, --, therefor.

Signed and Sealed this

Nineteenth Day of January, 2010

David J. Kappos
*Director of the United States Patent and Trademark Office*